US006594326B1

(12) United States Patent
Portmann et al.

(10) Patent No.: US 6,594,326 B1
(45) Date of Patent: *Jul. 15, 2003

(54) APPARATUS AND METHOD FOR SYNCHRONIZING A CONTROL SIGNAL

(75) Inventors: Clemenz Portmann, Cupertino, CA (US); John B. Dillon, deceased, late of Palo Alto, CA (US), by Nancy David Dillion, legal representative

(73) Assignee: Rambus Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/699,325

(22) Filed: Oct. 27, 2000

Related U.S. Application Data

(63) Continuation of application No. 08/897,658, filed on Jul. 21, 1997, now Pat. No. 6,205,191.

(51) Int. Cl.⁷ ................................................ H04L 7/00
(52) U.S. Cl. ...................... 375/354; 375/371; 327/152; 327/153; 327/161
(58) Field of Search ............................. 327/152, 153, 327/144, 141, 161; 375/354, 371

(56) References Cited

U.S. PATENT DOCUMENTS

| 4,973,860 | A |   | 11/1990 | Ludwig |         |
|-----------|---|---|---------|--------|---------|
| 5,022,057 | A | * | 6/1991  | Nishi et al. | 375/373 |
| 5,086,236 | A |   | 2/1992  | Feemster |       |
| 5,245,637 | A | * | 9/1993  | Gersbach et al. | 327/141 |
| 5,491,729 | A | * | 2/1996  | Co et al. | 375/371 |
| 5,532,633 | A |   | 7/1996  | Kawai |         |
| 5,534,805 | A |   | 7/1996  | Miyazaki et al. |  |
| 5,610,953 | A | * | 3/1997  | Betts et al. | 327/144 |
| 5,633,608 | A |   | 5/1997  | Danger |        |
| 5,675,271 | A |   | 10/1997 | Baqai et al. |   |
| 5,764,092 | A |   | 6/1998  | Wanda et al. |   |
| 5,778,214 | A | * | 7/1998  | Taya et al. | 713/400 |
| 5,793,823 | A |   | 8/1998  | Nishio et al. |  |
| 5,864,564 | A |   | 1/1999  | Levitt et al. |  |
| 5,887,040 | A |   | 3/1999  | Jung et al. |   |
| 5,995,555 | A | * | 11/1999 | Young | 375/296 |
| 6,020,773 | A |   | 2/2000  | Kan et al. |    |
| 6,064,707 | A | * | 5/2000  | Woodman, Jr. | 327/152 |
| 6,205,191 | B1| * | 3/2001  | Portmann et al. | 327/152 |
| 6,262,611 | B1| * | 7/2001  | Takeuchi et al. | 327/159 |
| 6,373,911 | B1| * | 4/2002  | Tajima et al. | 327/152 |

* cited by examiner

Primary Examiner—Stephen Chin
Assistant Examiner—Dac V. Ha
(74) Attorney, Agent, or Firm—Pennie & Edmonds LLP

(57) ABSTRACT

A synchronization circuit for gradually shifting the phase domain of a control signal to permit synchronization of a signal with a clock signal in a different phase domain in a system with a single frequency, but arbitrary phase relationship. The present invention allows a control signal in the phase domain of an internal clock to be synchronized with an external clock, when the phase domain of the external clock differs substantially from that of the internal clock. In synchronizing the control signal to the external clock, the present invention avoids the generation of runt pulses while providing a control signal synchronized to the external clock in the least amount of time feasible (i.e., with the lowest latency time). Because the present invention has no failure modes due to timing relationships, MTBF is infinite for failures caused by such relationships and therefore need not be a concern. This also implies that no risk is posed to the proper operation of the circuits driven thereby.

24 Claims, 15 Drawing Sheets

APPARATUS AND METHOD FOR SYNCHRONIZING A CONTROL SIGNAL

This is a continuation of application Ser. No. 08/897,658, filed Jul. 21, 1997, now U.S. Pat. No. 6,205,191.

BACKGROUND OF THE INVENTION

Today's complex digital systems contain storage devices, finite-state machines, and other such structures which control the movement of information by various clocking methods. Conversely, combinatorial logic devices, which are usually asynchronous, do not require time-based control signals for their operation. The output of an ideal combinatorial logic circuit is completely defined at any time by its inputs. In many digital circuits, however, it is expedient to cause the circuit's output to depend on both present and past inputs. Digital circuits whose outputs depend on such inputs are known as sequential circuits. A subset of this type of circuit is the synchronous sequential circuit, which requires a control signal to mark the passage of time and thereby delineate present inputs from past inputs. A clock signal serves this purpose, thereby controlling the transfer of digital information from one storage location to another.

An ideal clock signal is simply a periodic alternation between a logic high level and a logic low level. Typically, today's logic circuits use multi-phase clocks. Such clocking schemes may employ two-phase or four-phase clocks, or may use an even greater number of phases. The various phases are normally non-overlapping to prevent, as much as possible, race conditions and hazards, which commonly occur in digital circuits.

A hazard occurs when a circuit, under normal operating conditions, has the possibility of generating positive or negative pulses of possibly undefined duration at its output, when no such transitions should occur. This might occur, for example, where a designer fails to properly reduce logic terms. A race condition, on the other hand occurs when the output of a circuit is determined in part by which of two or more rising or falling edges is first received as an input to the circuit. Such a situation is normally avoided by synchronizing signals to a clock signal, meaning that the signals are related to the clock signal (and each other) in such a way that those signals may safely drive a circuit clocked by that clock signal. Such a race condition may result in a runt pulse at the circuit's output if no steps are taken to avoid it. Because a well-defined timing relationship is unlikely to exist between such input signals, neither the duration nor amplitude of a runt pulse is defined. One possible source of races is the improper distribution of clocking signals because the timing relationships involved become undefined.

Because modern digital systems are often very large, the number of devices driven by a clock may exceed the drive capabilities of the clock generation circuits, a common occurrence. In such a case, a clock signal will be distributed using one or more driver circuits because the clock circuit is unable to drive all of the devices directly. When using multiple clock drivers, the circuits being driven will be partitioned into logical subcircuits and the output of each clock driver used to drive those subcircuits. The signal propagation delays through each of the clock driver circuits will likely differ. The load presented to each drive circuit will also likely differ, also causing differences in the outputs of each clock driver circuit. These differences are known as clock skew.

Generally speaking, information transfer from a signal synchronized to a later clock to circuit elements clocked with an earlier clock will function correctly. However, a transfer of information from an earlier clock to a later clock may encounter problems. For example, if two flip-flops are connected serially with the first flip-flop providing input to the second flip-flop, the circuit should function as a shift register. If two separate clocks are provided, one to each flip-flop, and the second flip-flop is clocked simultaneously with or before the first flip-flop, both flip-flops may be loaded with the same data, and thus fail to function as a shift register. In such cases, the two clocks must be synchronized in some way.

Similarly, outputs from a first digital circuit operating using a first clock which are taken as input by a second digital circuit operating on a second clock must often be synchronized to the second clock. This is also true of asynchronous inputs generated by a user, sensors, or other such input sources.

FIG. 1 illustrates several of the proceeding concepts. FIG. 1 shows a clock enable signal rclk_en 100 generated by a control signal receiver 102 from a bus control input 104 (received from a bus (not shown)). Clock enable signal rclk_en 100 enables the generation of a clock rclk 110. A bus clock 112 is also received from the bus. Bus clock 112 is provided to a phase detector 114 and a delay-locked loop 116. Phase detector 114 compares bus clock 112 with a clock mclk 120, which also clocks control signal receiver 102. Phase detector 114 generates a phase difference signal 122 that represents the difference in phase between bus clock 112 and mclk 120. Delay-locked loop 116 generates a master clock dllclk 130 by variably delaying bus clock 112. Delay-locked loop 116 uses phase difference signal 122 to set the amount of delay necessary to keep mclk 120 synchronous with bus clock 112.

The circuit of FIG. 1 operates in the following manner. Clock dllclk 130 is fed into a inverter 132 which drives a first NAND gate 134 and a second NAND gate 136. The second input of first NAND gate 134 is tied high to voltage VDD 160, causing the output of first NAND gate 134 to follow the input of inverter 132. First NAND gate 134 outputs a delayed version of dllclk 130, which then passes through an inverter string 140 and emerges as mclk 120. Similarly, second NAND gate 136 drives an inverter string 150 and emerges as rclk 110. Inverter string 150 serves as a clock driver circuit, allowing rclk 110 to drive large numbers of devices.

The function of second NAND gate 136 is to disable rclk 110. The function of first NAND gate 134 is to maintain equality in the delays experienced in generating rclk 110 and mclk 120. Because the delay experienced in generating rclk 110 from dllclk 130 is equal to that experienced in generating mclk 120 from dllclk 130, rclk 110 is synchronous with mclk 120, save for the fact that rclk 110 is not generated until enabled by rclk_en 100. So long as the delays in generating rclk 110 and mclk 120 are kept equal, other devices may therefore be used in place of first NAND gate 134 and second NAND gate 136, such as NOR gates or tristable devices. However, the delays experienced in generating rclk 110 from dllclk 130 should always be identical to those experienced in generating mclk 120. Because the phase delay experienced in generating mclk 120 from dllclk 130 is defined (i.e., the delay is calculable and/or measurable, although it may not be known), a substantially quantifiable phase relationship exists between mclk 120 and dllclk 130. An example of a delay-locked loop receiver is described in U.S. patent application Ser. No. 08/795,657 entitled "DELAY LOCKED LOOP CIRCUITRY FOR CLOCK DELAY ADJUSTMENT," having as inventors Kevin S.

Donnelly, Pak Shing Chau, Mark A. Horowitz, Thomas H. Lee, Mark Johnson, Benedict Lau, Leung Yu, Bruno W. Garlepp, Yiu-Fai Chan, Jun Kim, Chanh Vi Tran, and Donald Stark, and assigned to Rambus, Inc., the assignee of the present invention, and is hereby incorporated by reference in its entirety.

FIG. 2A illustrates the waveforms which may be generated by the operation of the circuit illustrated in FIG. 1. Throughout this discussion, references to a signal or element of a preceding figure will use the original reference numbers. Moreover, idealized signal waveforms will be used to simplify the discussion. As illustrated in FIG. 2A, the waveform of dllclk 130 is a square wave having a 50% duty cycle and a period of ($T_3$–$T_0$). As is shown in FIG. 2A, rclk 110 and mclk 120 of FIG. 1 are simply delayed versions of dllclk 130, assuming the circuit is operating under nominal conditions and, with regard to rclk 110, rclk_en 100 is active. These nominal signals are indicated by traces rclk_nom 202 and mclk_nom 204.

However, the delay experienced between dllclk 130 and the outputs of the circuit in FIG. 1 are affected by variables such as temperature, supply voltage, process parameters, and other such variables. For example, at a low operating temperature with a high supply voltage and a fast process, the circuit of FIG. 1 provides a relatively short delay, as indicated by a trace r/mclk_fast 210. Trace r/mclk_fast 210 experiences a delay of ($T_1$–$T_0$), as indicated by a transition 211.

Alternatively, a low supply voltage, high operating temperature, and slow process significantly increase the delay experienced. Such a situation is shown in FIG. 2A by a trace r/mclk_slow 215, which experiences a delay of ($T_4$–$T_0$), as indicated by a transition 216. Variations in process parameters may also alter the delay provided by the circuit in FIG. 1, making the delay longer or shorter depending on the parameter and the manner in which it is varied. Thus, the phase relationship between dllclk 130 and either of rclk 110 or mclk 120 is an arbitrary (although measurable) one, due to the dependence on loading, process, voltage, temperatures, and other factors. Any of these conditions can lead to errors in the generation of rclk 110 using circuits of the prior art.

In operation, the circuit of FIG. 1 generates rclk 110 and mclk 120 in a manner which keeps rclk 110 and mclk 120 substantially in phase. This is done through careful circuit design, taking into consideration the loads driven by these clock signals, the proportions of the inverters in inverter strings 140 and 150, NAND gates 134 and 136, the physical layout of these elements, and other considerations.

FIGS. 2B, 2C, and 2D are phase diagrams corresponding to the various traces of FIG. 2A. FIG. 2B illustrates the nominal phase delay represented by rclk_nom 202 and mclk_nom 204. Clock dllclk 130 is shown as a vector 220 having a phase of 0°. Clocks rclk_nom 202 and mclk_nom 204, which are synchronized, are shown as a vector 221. Vector 221 lags vector 220 by about 180°. In these figures, the delay experienced between dllclk 130 and rclk_nom 202/mclk_nom 204 is given by:

$$T_{Delay} = \frac{\phi}{360°} \cdot T_{dllclk\ 130} \quad (1)$$

where $T_{Delay}$ is the delay experienced, $\phi$ is the phase difference, and $T_{dllclk\ 130}$ is the period of dllclk 130. Thus, vector 221 lags vector 220 by 0.5 $T_{dllclk\ 130}$, which is shown in FIG. 2B as a period of $T_{Delay}$ 222. This period is equal to the time ($T_2$–$T_0$) in FIG. 2A.

In FIG. 2A, dllclk 130 is active from 0° to 180° and inactive from 180° to 360° (i.e., 0°). As will be discussed in detail with regard to FIG. 2E, rclk_nom 202 can safely be synchronized by the circuit of FIG. 1 when dllclk 130 is inactive (i.e., between 180° and 360°). This synchronization point is nominally at a point in the center of the inactive phase of dllclk 130 (i.e., at a phase angle of about 270°).

FIGS. 2C and 2D illustrate the cases shown in FIG. 2A as r/mclk_fast 210 and r/mclk_slow 215, respectively. In both of these figures, dllclk 130 is again shown as a vector 220. Clock r/mclk_fast 210 is shown as a vector 223 in FIG. 2C. Vector 223 lags vector 220 by only about 45° due to the environmental and process factors previously discussed. This translates to about 0.125 $T_{dllclk\ 130}$, which is shown in FIG. 2C as a period of $T_{Delay}$ 226. This period is equal to the time ($T_1$–$T_0$) in FIG. 2A.

FIG. 2D shows clock r/mclk_slow 210 as a vector 225. Vector 225 lags vector 220 by a large amount, about 382°, again due to the environmental and process factors previously discussed. This translates to about 1.06 $T_{dllclk\ 130}$, which is shown in FIG. 2C as a period of $T_{Delay}$ 224. This period is equal to the time ($T_4$–$T_0$) in FIG. 2A.

FIG. 2E shows the preferred timing -relationship between rclk_en 100 and dllclk 130. Preferably, rclk_en 100 goes active (in this case, high) at a time $T_0$ when dllclk 130 is inactive (i.e., low), thereby allowing dllclk 130 to propagate through inverter 132, NAND gate 136, and inverter string 150, thereby providing a delayed version of itself, rclk 110. The delay experience by dllclk 130 is indicated in FIG. 2E by a transition 230 having a duration ($T_2$–$T_1$).

Unfortunately, as illustrated in FIG. 2F, simply allowing rclk_en 100 to become active at any point in time can cause the generation of runt pulses. In FIG. 2F, rclk_en 100 goes active (i.e., high) at a time $T_0$, which is during a period when dllclk 130 is also active (i.e., high). Because the circuit in FIG. 1 is simply a combinatorial circuit, rclk 110 will go high any time rclk_en 100 and dllclk 130 are both high, albeit at a later time due to delay within the circuit. This being the case, a race condition exists and, in this case, produces a runt pulse 235. The leading edge of runt pulse 235 is related to rclk_en 100 as indicated by a transition 240. The delay between these two edges is ($T_0$–$T_2$), and is equal to the delay experienced between dllclk 130 and rclk 110 ($T_5$–$T_4$) as indicated by a transition 245. The falling edge of runt pulse 235 occurs at a time $T_3$ and corresponds to the falling edge of dllclk 130 occurring at $T_1$.

Runt pulse 235, having indeterminate amplitude and duration, is undesirable because it may cause intermittent failures, depending on the timing of the asynchronous input and the nature of the clocked circuit. Such effects can include the failure to meet the timing constraints of the circuits driven by the clock, the generation of metastable states in bistable devices, certain of the driven circuits being out of synchronization with other portions thereof, and other undesirable effects.

A common solution to such problems is the inclusion of a latch or flip-flop to gate the offending control signal. FIG. 3 illustrates such a solution. A latch 300 is used to synchronize rclk_en 100 with dllclk 130. Clock enable rclk_en 100 is gated by latch 300, thereby generating a gated version of rclk_en 100, a clock enable signal g_rclk_en 310, which is provided to second NAND gate 136. In using a flip-flop to gate the input, g_rclk_en 310 is prohibited from enabling the output of rclk 110 until a time at which dllclk 130 is active. The waveforms generated using this common solution are illustrated in FIGS. 4A, 4B, and 4C.

FIG. 4A illustrates the case where rclk_en 100 goes high at a time $T_0$ when dllclk 130 is low. As was illustrated in FIG. 2E, this situation would not even cause problems for the circuit illustrated in FIG. 1. In the circuit illustrated in FIG. 3, this situation is also handled correctly. In FIG. 4A, rclk_en 100 goes high at a time $T_0$, but must wait for the next rising edge of dllclk 130. This occurs at a time $T_1$, as indicated by a transition 400. At time $T_1$, the rising edge of dllclk 130 clocks the active state of rclk_en 100 into latch 300, thereby causing a rising edge on the output of latch 300. This is illustrated in FIG. 4A as the rising edge in g_rclk_en 310 at time $T_1$, and is indicated by a transition 405. For simplicity, this timing relationship is shown in FIG. 4A as being instantaneous; in an actual circuit, there would be some delay associated with transition 405 which might delay g_rclk_en 310 going active by one cycle of dllclk 310.

At this point, propagation of dllclk 130 through inverter string 150 is enabled and dllclk 130 is propagated, appearing as rclk 110 at a time $T_2$, which is indicated by a transition 420. The duration of this transition is equivalent to the delay experienced by dllclk 130 propagating through inverter string 150 when generating rclk 110.

FIG. 4B illustrates the anomalous situation shown in FIG. 2F. However, instead of generating a runt pulse like the one shown in FIG. 2F, the circuit of FIG. 3 effectively delays the application of g_rclk_en 310 to second NAND gate 136 until such time as dllclk 130 transitions to an active state. As shown in FIG. 4B, rclk_en 100 becomes active at a time $T_3$, which is at a time when dllclk 130 is also active. Without latch 300, a runt pulse such as that exhibited by the circuit of FIG. 1 would be generated. However, rclk_en 100 is not applied directly to second NAND gate 136, but is gated through latch 300 by dllclk 130. This dependency is indicated in FIG. 4B by a transition 425. When dllclk 130 becomes active at a time $T_4$, rclk_en 100 is already active. This is propagated through latch 300, causing g_rclk_en 310 to also become active. This transition is indicated by a transition 430, which again is shown as being instantaneous for the sake of simplicity. A pulse 435 of dllclk 130 then propagates through inverter string 150 and emerges as a pulse 440 of rclk 110, as before. This occurs at a time $T_5$. The delay between pulse 435 (enabled by g_rclk_en 310) and pulse 440 is indicated by a transition 445 which is equal in duration to the delay experienced by pulse 435 ($T_5$–$T_4$).

However, the solution provided by the circuit illustrated in FIG. 3 is not without its own problems. Any bistable device (i.e., circuits containing flip-flops, latches, or other switching circuits) may suffer from what is known as metastability, under the proper input conditions.

Normally, digital logic has two stable'states which are a function of the steady-state transfer functions of the elements of which they consist. However, a third equilibrium point exists in these transfer functions. This is known as the metastable state and occurs somewhere near the half-way point between the voltage levels representing a logic 0 and a logic 1. However, this is not a truly stable operating point because random noise will tend to drive a circuit operating at this point towards one of the stable operating points (i.e., a logic 0 or logic 1). Additionally, this metastable state lasts for a non-deterministic period of time, creating the possibility that circuits driven by elements in this state may find themselves in unknown states for an indeterminate time and almost assuredly out of synchronization once the metastability has resolved.

Such a phenomena is illustrated by the traces in FIG. 4C. In FIG. 4C, rclk_en 100 is applied even later than in FIGS. 4A and 4B, at a time $T_6$. However, also occurring at time $T_6$ is a rising edge of dllclk 130. This results in a race condition. Because they occur at substantially the same instant (i.e., at a time which violates the setup and hold times of latch 300), the output of latch 300, g_rclk_en 310, is put into a metastable state. This condition is indicated by transitions 450 and 455, which indicate that both rclk_en 100 and dllclk 130 are driving the transition which is supposed to occur in g_rclk_en 310. The metastable state of g_rclk_en 310 resolves to a high level within some indeterminate time (as shown in FIG. 4C). This then drives rclk_glitch 475, as indicated by a transition 470. Clock rclk_glitch 475 may then operate normally, but will likely reflect a delayed version of the glitches caused by the metastability of g_rclk_en 310, in the form of runt pulses. The latter situation is indicated by a runt pulse 475, which occurs at a time $T_7$. If this occurred, synchronization in the circuits driven by rclk_glitch 475 would likely be lost, resulting in improper operation of those circuits.

While this type of problem can be addressed to some extent by changes in design, it is impossible to eliminate. The measure of the frequency with which such a failure could be expected to occur is known as the mean time between failures (MTBF). However, this figure is difficult to calculate and changes with variations in the process used to fabricate the device and operating conditions such as temperature and supply voltage. Moreover, the possibility of failure is not eliminated by the use of such analytical methods.

What is therefore required is a circuit architecture which removes the possibility of the runt pulses created by the circuit of FIG. 1 and the occasional metastability experienced by the circuit of FIG. 3. In other words, such a circuit should have no probability of failure resulting from the gating of the clock. Such a circuit should allow the synchronization of an enable signal such as rclk_en 100 with a clock signal such as dllclk 130 with minimum-latency, and insensitivity to process variations and environmental parameters such as temperature and supply voltage.

SUMMARY OF THE INVENTION

The method of the present invention includes the steps of generating a series of intermediate clock signals using a first clock signal. A control signal is then synchronized with one or more of the series of intermediate signals in a successive manner. For example, the synchronizations may proceed from a last one of each successive one of the series of clock signals to a first one of the series of clock signals. If necessary, the control signal may be synchronized with the first clock signal. The control signal is assumed to be synchronous to the last one of the series of clock signals, which also serves as a second clock signal. Such a phase relationship must be substantially determinable, but may vary due to environmental, process and other factors, if the effects of such factors may be quantified.

The method of the present invention addresses the aforementioned problems of the prior art by gradually shifting the phase domain of a control signal. The present invention allows a control signal in the phase domain of an internal clock to be synchronized with an external clock, when the phase of the external clock differs substantially from that of the internal clock. In synchronizing the control signal to the external clock, the present invention avoids the generation of runt pulses while providing a control signal synchronized to the external clock in the least amount of time feasible (i.e., with the lowest latency time). Because the present invention has no synchronization-related failure modes, MTBF is infinite and therefore need not be a concern. This also implies that no such risk is posed to the proper operation of the circuits driven thereby.

A series of delayed, intermediate clock signals propagating in a first direction are produced from a first clock signal. A second clock signal is generated at the end of the intermediate chain. A control signal is input to a chain of circuit elements which re-synchronize the control signal received with one of the intermediate clock signals, propagating in a direction opposite to the first direction. The first circuit element in the synchronization chain is clocked by the last intermediate clock, the second synchronization element is clocked by the second to last intermediate clock, and so on.

The control signal thus works its way back along the intermediate clock chain, gradually shifting its phase domain from one clock signal to another. In other words, this method moves the control signal one phase step with each intermediate clock. If a four stage chain is used, the synchronization signal will work its way back to complete synchronization in four steps. The number of stages will depend on the phase and timing relationships between the first and second clocks. In this manner, the control signal is gradually shifted from the phase domain of the second clock to the phase domain of the first clock.

A further understanding of the nature and advantages of the present invention may be realized by reference to the remaining portions of the specification and the drawings.

DETAILED DESCRIPTION OF THE SPECIFIC EMBODIMENTS

Figure 5:
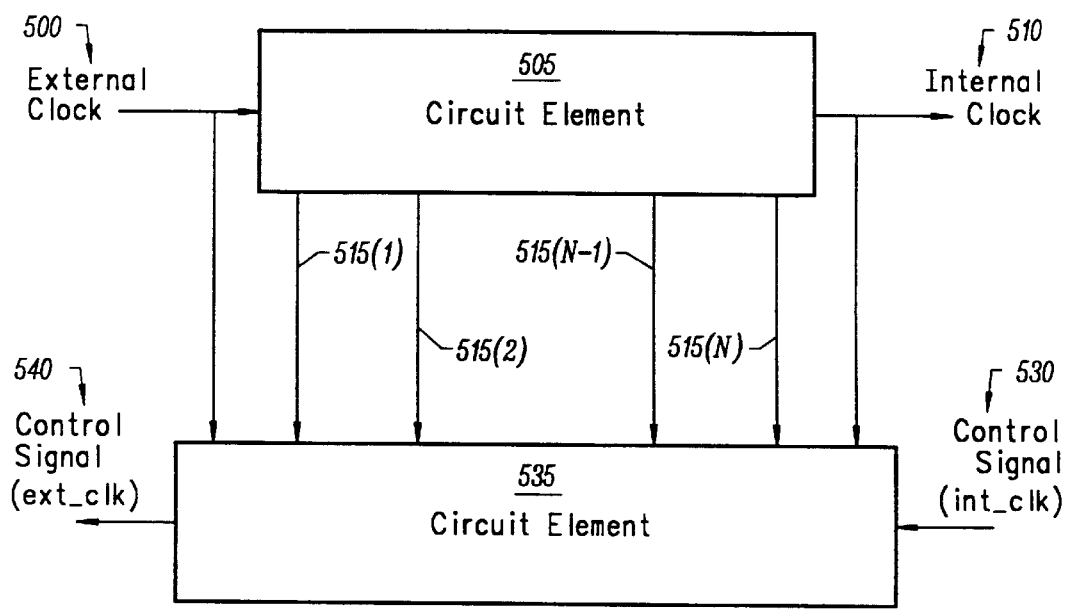
FIG. 5 is a block diagram of one embodiment of the present invention.

The method of the present invention addresses the problems of the prior art by gradually shifting the phase domain of a control signal from that of an internal clock to that of an external clock. FIG. 5 illustrates a block diagram of a design embodying the method of the present invention. As before, references to elements appearing in earlier figures will be referred to using the same reference numbers. As shown in FIG. 5, an external clock 500 (e.g., dllclk 130 of FIG. 1) is fed into a circuit element 505. The circuit element 505 has several functions and may be one of several different devices. One function of circuit element 505 is to generate an internal clock 510 (e.g., mclk 120 of FIG. 1).

Additionally, circuit element 505 continuously generates a series of intermediate clocks 515(1)–(N), when external clock 500 is applied to circuit element 505. Intermediate clocks 515(1)–(N) are increasingly delayed versions of external clock 500. Internal clock 510 lags external clock 500 by an unknown duration. Intermediate clock 515(1) lags external clock 500 by a fraction of this amount. Preferably, each successive intermediate clock preferably lags its predecessor by a similar amount. Finally, internal clock 510 lags intermediate clock 515(N) by a similar amount. While the amount by which one of these signals lags its predecessor may vary, it is preferable for the delay between these signals to be substantially similar both for purposes of simplification and reliability. This is due to the fact that the difference between the given signal and the signal being synchronized at that point should not exceed a maximum value, as will be discussed later. However, a subset of these signals may be used in synchronizing a control signal 520, if the appropriate timing constraints are met (i.e., the phase delay between each intermediate clock is not too large). Because intermediate clocks 515(1)–(N) and internal clock 510 are delayed versions of external clock 500, internal clock 510 is equivalent to the intermediate clock which would follow intermediate clock 515(N).

The circuit of FIG. 5 receives a control signal (int_clk) 530 as an input. Internal clock 510 clocks the circuits that generate control signal (int_clk) 530. Thus, it can be implied that control signal (int_clk) 530 is synchronous to internal clock 510 or is at least close enough in phase that the two signals may safely be synchronized. A circuit element 535 receives control signal (int_clk) 530 as an input. Circuit element 535 also receives internal clock 510, intermediate clocks 515(1)–(N), and external clock 500 as inputs.

Figure 3:
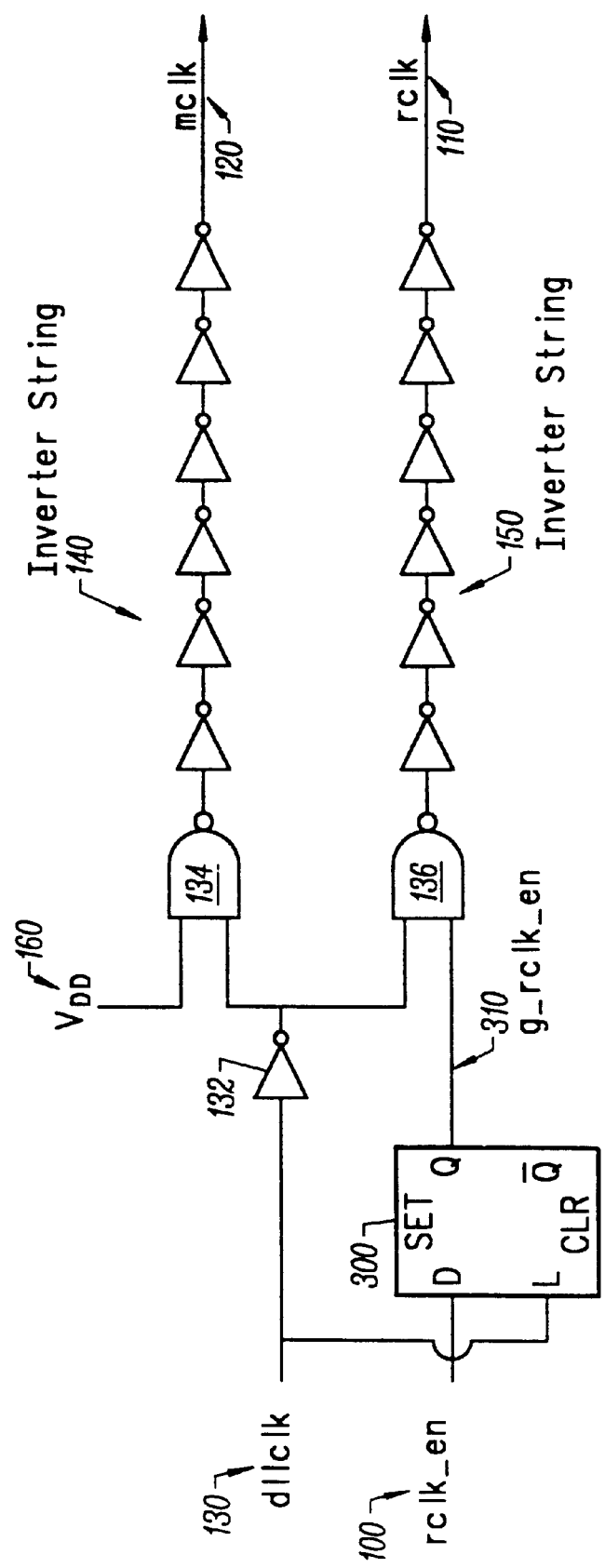
FIG. 3 is a circuit diagram of another embodiment of a dual clock driver circuit of the prior art.
Figure 4A:
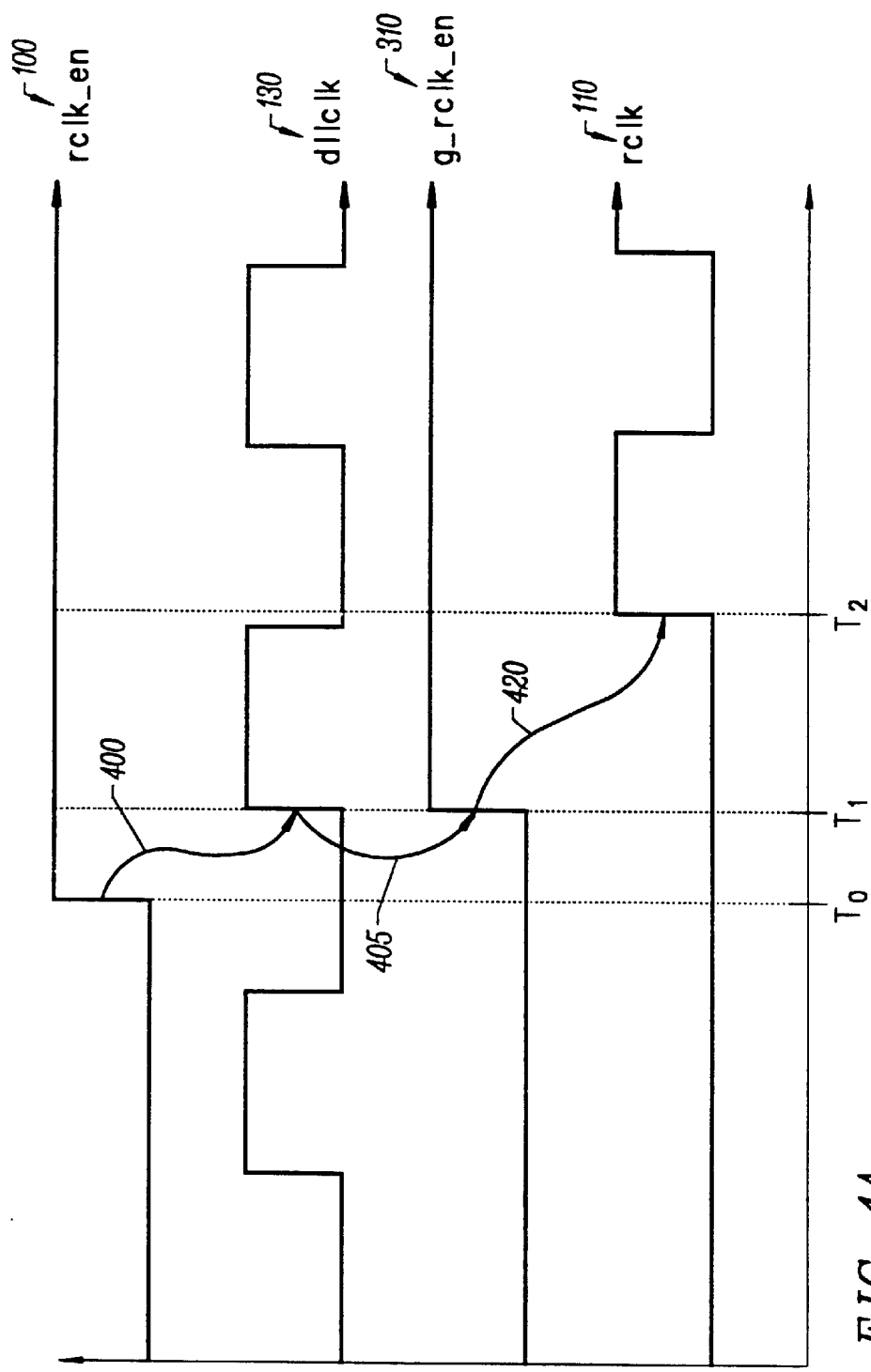
FIG. 4A is a first timing diagram of the proper operation of the circuit in FIG. 3.
Figure 4B:
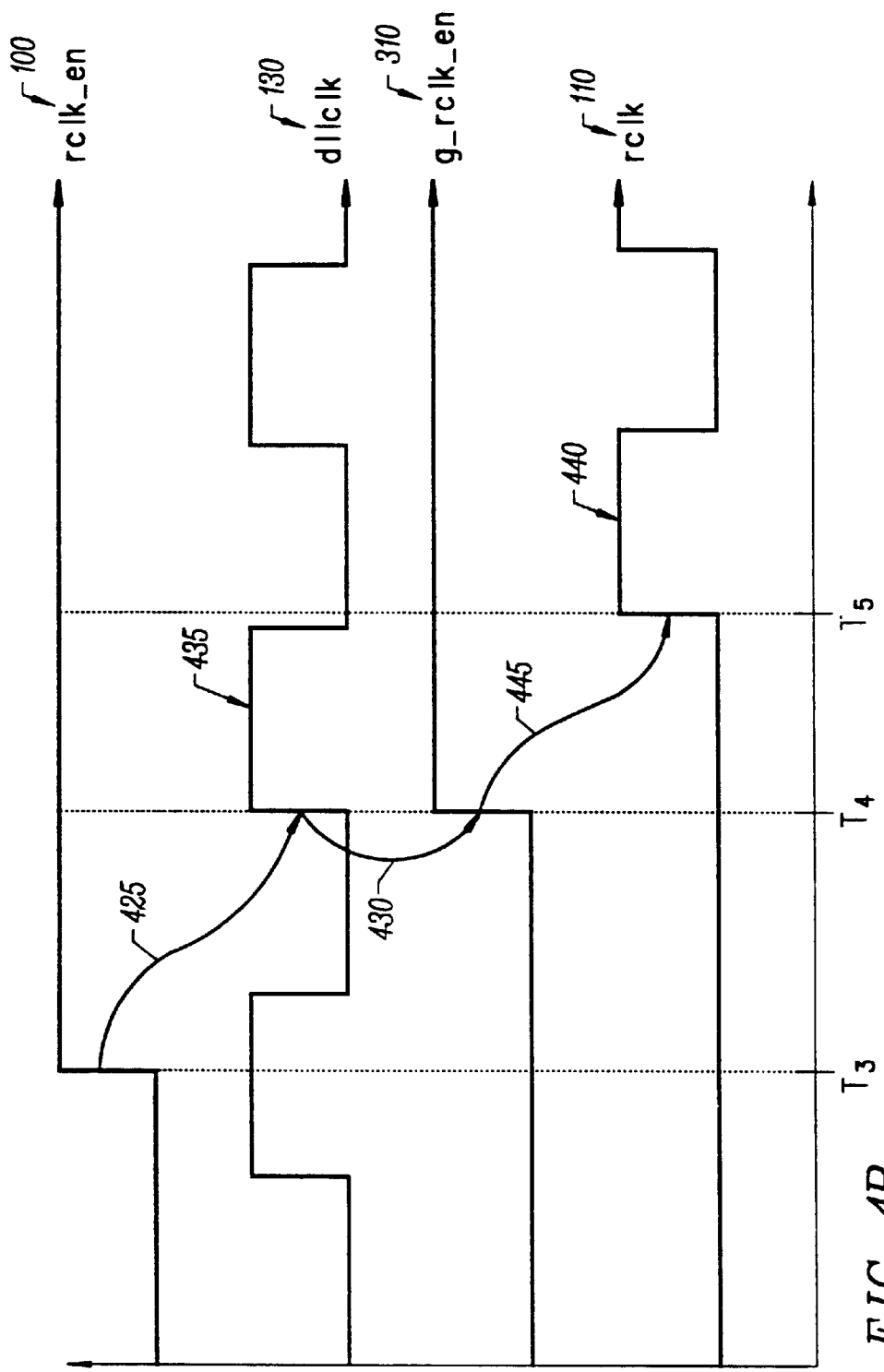
FIG. 4B is a second timing diagram of the proper operation of the circuit in FIG. 3.
Figure 4C:
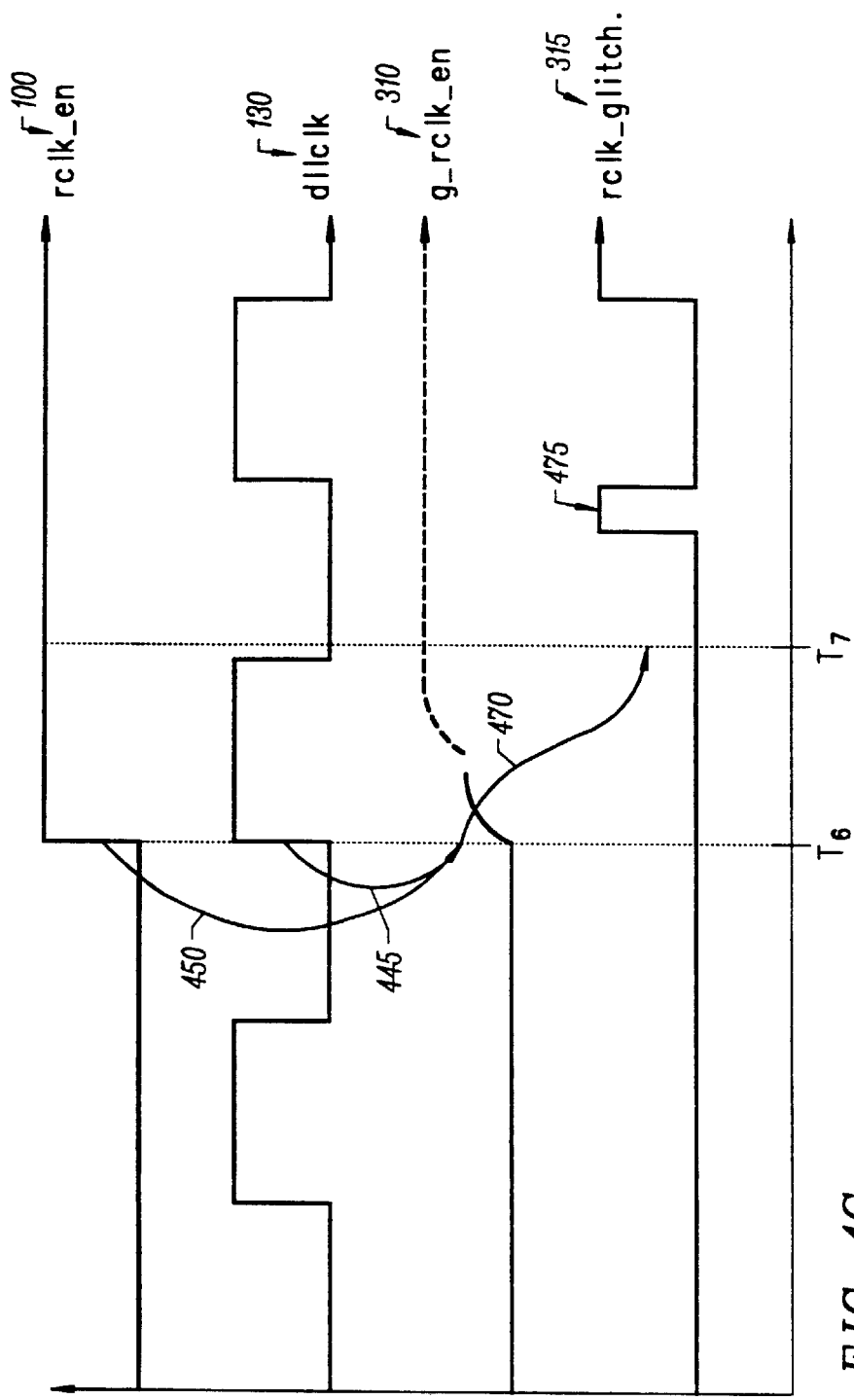
FIG. 4C is a timing diagram showing metastability in the circuit in FIG. 3.

Circuit element 535 operates in the following manner. Control signal (int_clk) 530 is first re-synchronized to internal clock 510 by circuit element 535. The resulting signal is then successively synchronized with each one of intermediate clock 515(1)–(N), gradually shifting the phase domain of the control signal. Finally, the control signal in the phase domain of intermediate clock 515(1) is synchronized to external clock 500 by circuit element 535, resulting in a control signal (ext_clk) 540. Control signal (ext_clk) 540 is then synchronous to external clock 500, and may then be used to enable the incoming clock signal (not shown). For example, control signal (ext_clk) 540 could then serve as rclk_en 100 in FIG. 1 to enable the generation of rclk 110 by inverter string 150 without presenting the possibility of generating runt pulses or causing timing-related failures. Optionally, if the phase of control signal (int_clk) 530 is close enough to that of internal clock 510, the re-synchronization of control signal (int_clk) 530 to internal clock 510 may be unnecessary. Similarly, the phase of the re-synchronized control signal may be close enough to that of external clock 500 to permit the use of the re-synchronized control signal without re-synchronization to external clock 500 Circuit element 505 may be one of any number of devices, but must be able to generate the delayed versions of external clock 500, as previously described. In practice, circuit element 505 may simply consist of a requisite number of delay elements, which again should preferably provide substantially similar delays between the signals generated. Often, however, circuit element 505 will be a clock drive circuit which allows external clock 500 to be distributed to numerous circuit elements as internal clock 510. For example, a string of inverters might be used to provide such drive capabilities. The string of inverters would start with a relatively small inverter capable of driving a slightly larger inverter. This continues to the point where the last inverter is capable of driving the requisite number of circuit elements as internal clock 510. Such a circuit is similar to that shown in FIG. 1 as inverter string 140. However, a circuit according to the method of the present invention would not suffer the shortcomings thereof, nor the shortcomings of the circuit illustrated in FIG. 3.

Figure 1:
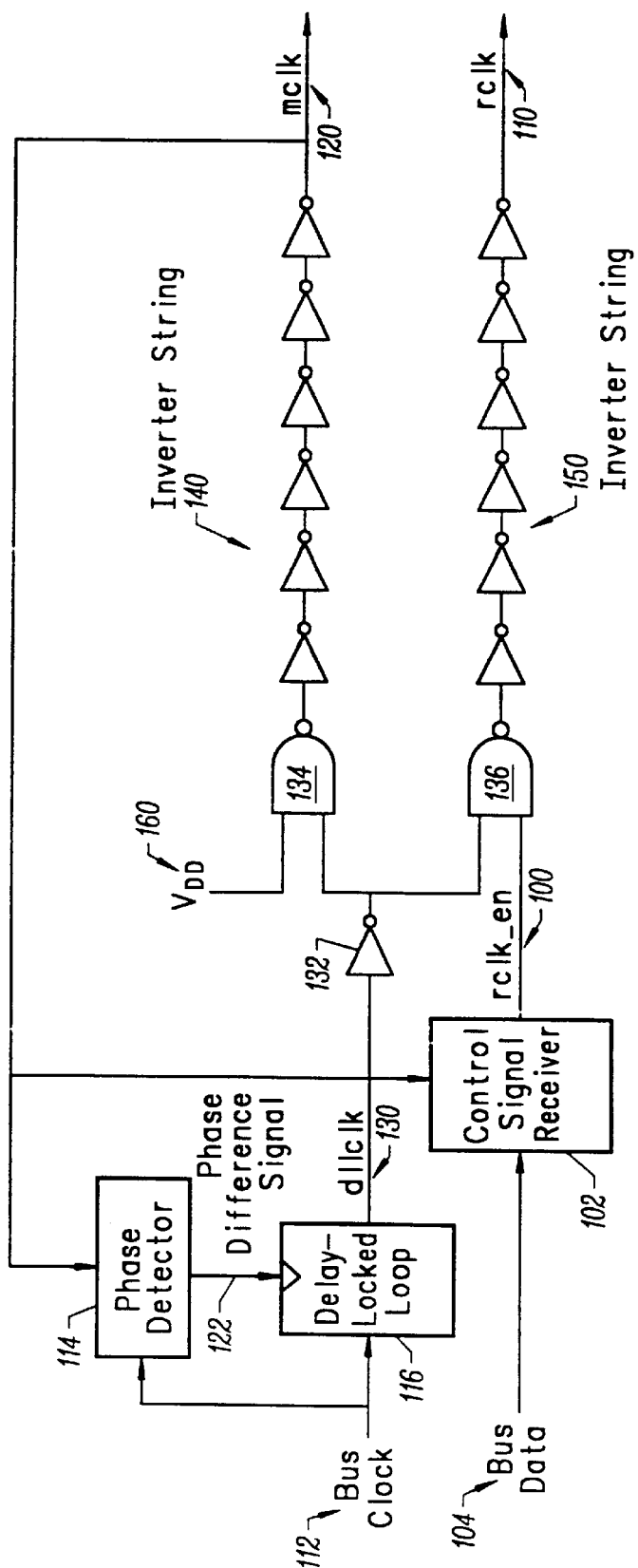
FIG. 1 is a circuit diagram of one embodiment of a dual clock driver circuit of the prior art.
Figure 6A:
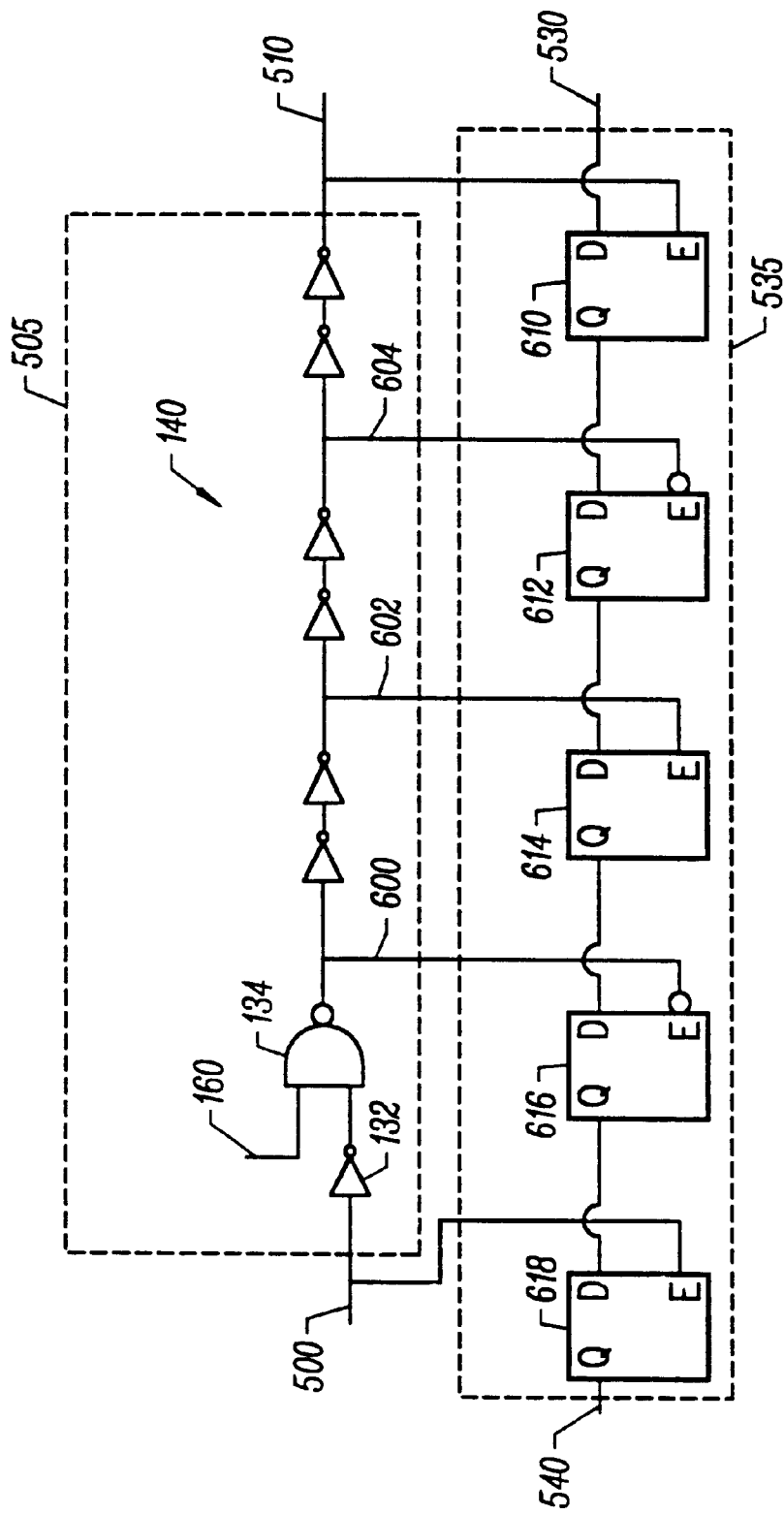
FIG. 6A is a circuit diagram of one embodiment of the present invention which follows the architecture shown in FIG. 5.

FIGS. 6A–6F illustrate such an implementation and the waveforms associated with each. FIG. 6A illustrates a circuit implementation according to the block diagram of FIG. 5. This circuit uses circuit elements from the circuit illustrated in FIG. 1, but avoids the problems associated therewith. As in FIG. 5, the circuit in FIG. 6A shows a circuit element 505 which receives external clock 500 as input and generates internal clock 510. Circuit element 505 also generates intermediate clocks 600, 602, and 604, which serve as examples of intermediate clocks 515(1)–(N) in FIG. 5. Internally, circuit element 505 includes inverter 132, first NAND gate 134, and inverter string 140, as shown in FIG. 1. External clock 500 and internal clock 510 correspond to dllclk 130 and mclk 120, respectively, in FIG. 1.

As in FIG. 5, control signal (int_clk) 530 in FIG. 6A is received by circuit element 535 and emerges from circuit element 535 as control signal (ext_clk) 540. As before, control signal (int_clk) 530 is transferred from the phase domain of internal clock 510 to the phase domain of external clock 500 by circuit element 535. In FIG. 6A, circuit element 535 preferably includes latches 610, 612, 614, 616, and 618. However, latch 610 (and/or latch 618) may be removed if the control signal and internal clock (and/or external clock) is close enough in phase. Each latch serves to re-time transitions in control signal (int_clk) 530 to a phase domain corresponding to the signal enabling a particular latch (or its inverse, as explained later), thereby generating an intermediate control signal corresponding to each latch. Latch 610 is initialized by pulling its input low by default, using a pulldown, for example. This also initializes latches 612, 614, 616, and 618, once circuit element 535 has been operating long enough for the initialized input to propagate through circuit element 535. This would normally be part of a system initialization cycle.

Figure 6B:
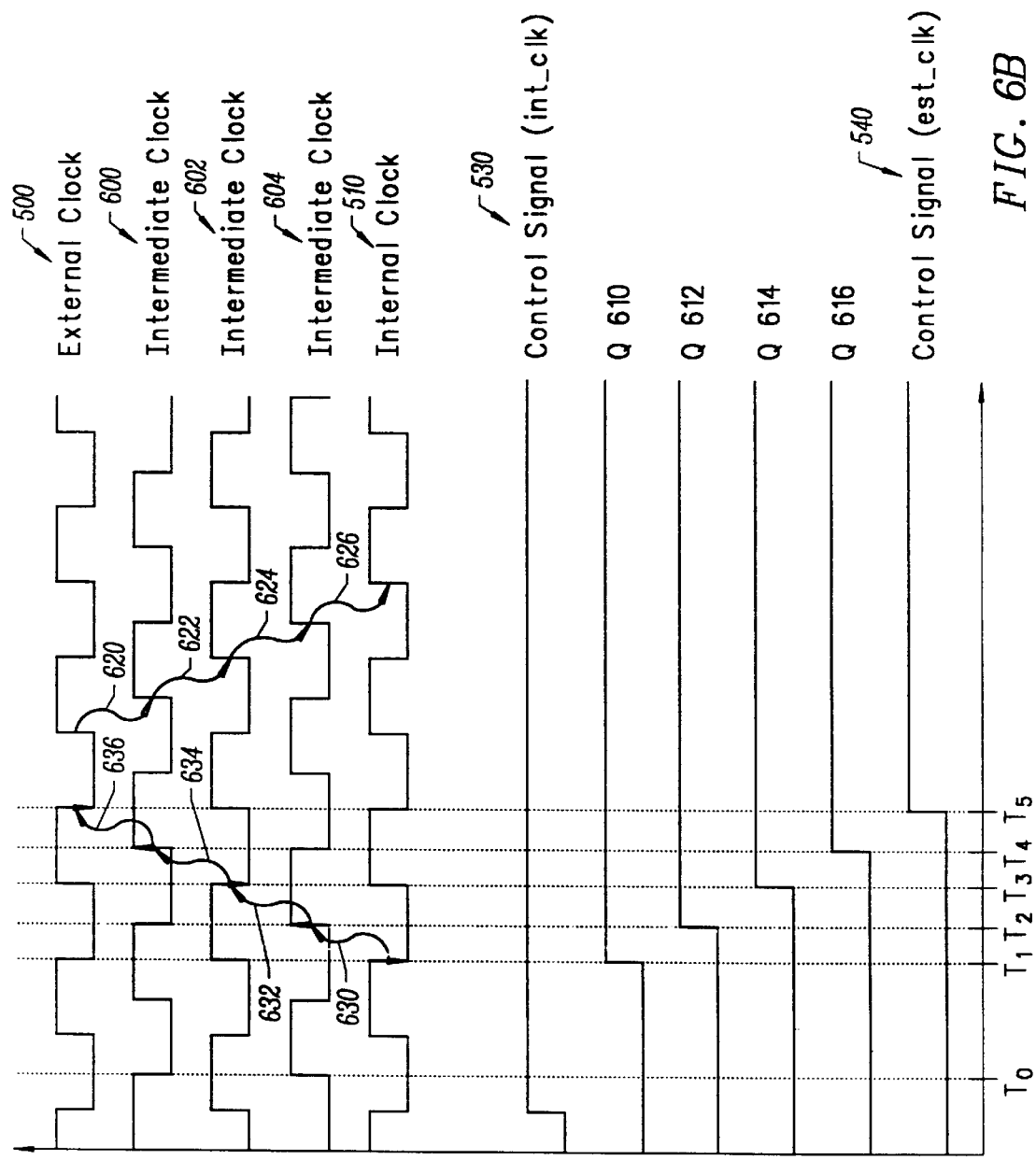
FIG. 6B is a first timing diagram of the phase domain shifting which occurs during the operation of the circuit in FIG. 6A.

The graph in FIG. 6B illustrates the waveforms generated during the operation of the circuit illustrated in FIG. 6A. Because external clock 500 has been applied for a sufficient length of time by a time $T_0$, the clock signals illustrated in FIG. 6A are at a steady state. For simplicity, the total delay between external clock 500 and internal clock 510 is taken to be equal to one clock period. Thus, using the circuit of FIG. 6A, intermediate clock 600 is delayed from external clock 500 by about one quarter of a clock period, as indicated by a transition 620, because four such delays are employed. Likewise, the delay between the intermediate clocks are also about one fourth of a clock period, as is the delay between intermediate clock 604 and internal clock 510. Thus, in this configuration, a delay of one clock period is required to resynchronize control signal (int_clk) 530 to become control signal (ext_clk) 540. These delays are illustrated in FIG. 6B by transitions 622, 624, and 626 for an equilibrium state in the circuit of FIG. 6A.

Each one of latches 610, 612, 614, 616, and 618 re-times control signal (int_clk) 530 into a new phase domain, generating intermediate control signals Q 610, Q 612, Q 614, and Q 616 shown in FIG. 6B, respectively. This gradual shifting of clock signal (int_clk) 530 from the phase domain of internal clock 510 to that of external clock 500 generates control signal (ext_clk) 540. To reduce latency, the latches' enable inputs alternate between non-inverting and inverting inputs. This has the effect of alternately latching control signal (int_clk) 530 on rising and falling edges of the waveforms shown in FIG. 6B (illustrated by transitions 630, 632, 634, and 636). The embodiment illustrated in FIG. 6A operates in the following manner.

Control signal (int_clk) 530 goes active at time $T_0$ and subsequently remains high until the clock enabled thereby is to be disabled. Preferably, control signal (int_clk) 530 is first latched by latch 610 at a time $T_1$ using internal clock 510 as an enable signal. The output of latch 610 is latched by latch 612 at a time $T_2$ using intermediate clock 604 as an enable signal. This change in phase domain from internal clock 510 to intermediate clock 604 is indicated in FIG. 6B by transition 630. Latch 612 has an inverting enable input so that the output of 610 is latched on the rising edge of intermediate clock 604. This permits the output of latch 610 to be latched by latch 612 one-half clock period sooner than if the enable input of latch 612 was non-inverting (thus latching on the falling edge of intermediate clock 604).

This process is repeated for latches 614 and 616 as is indicated by transitions 632 and 634. Finally, the signal output by latch 618 is close enough in phase to be latched by external clock 500, as is illustrated by transition 636. In this manner, control signal (int_clk) 530 has its phase domain shifted from that of internal clock 510 to that of external clock 500. In effect, the latches simply delay control signal (int_clk) 530, thereby gradually altering its phase domain.

Figure 2A:
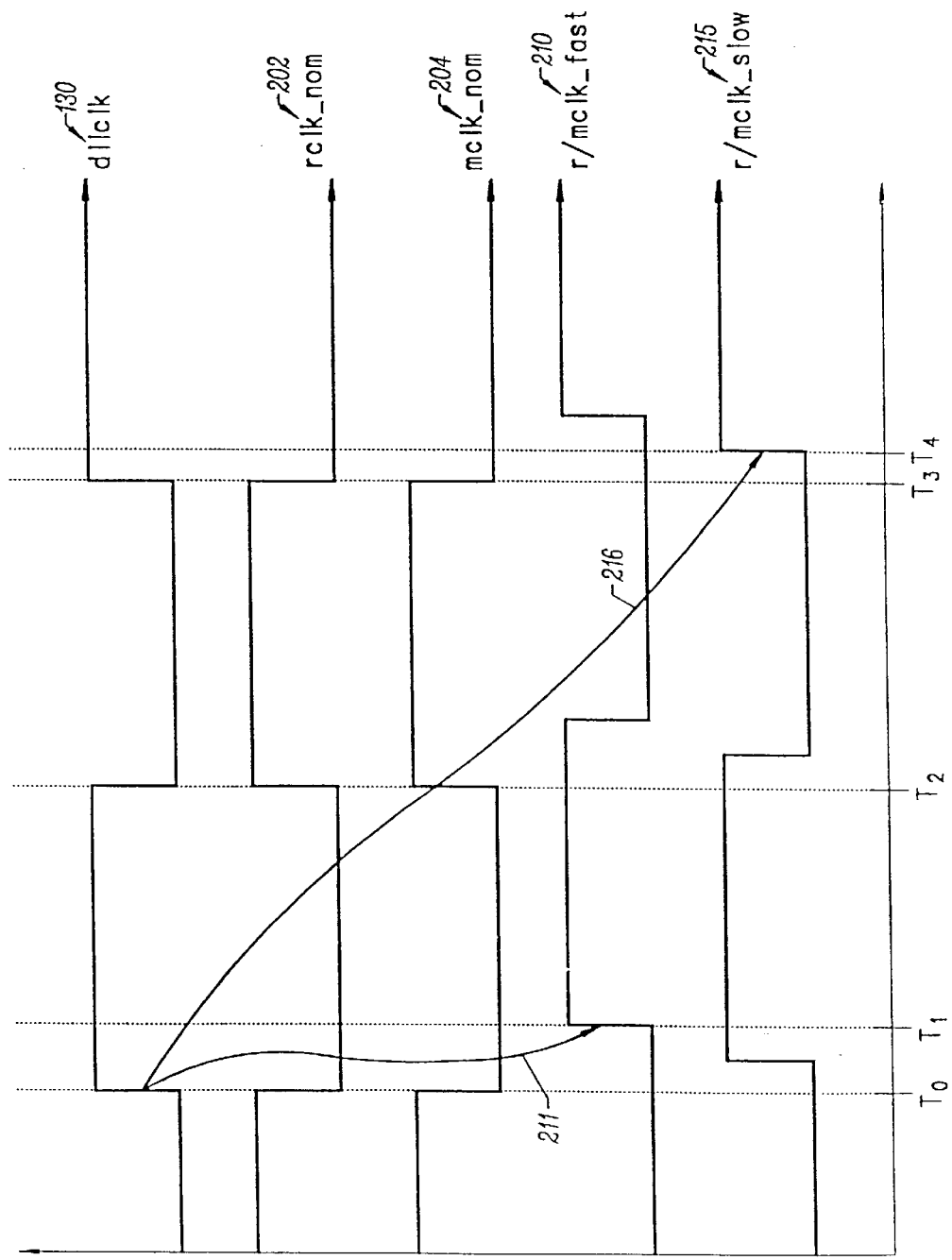
FIG. 2A is a timing diagram showing delays experienced by the circuit in FIG. 1 when subjected to varying environmental conditions.
Figure 2B:
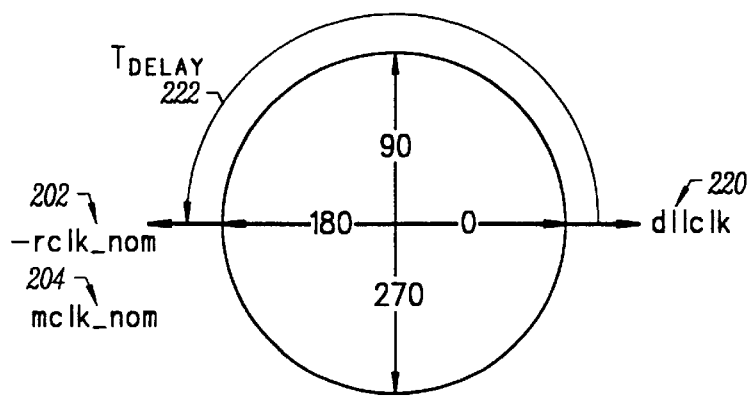
FIG. 2B is a phase diagram of the operation of the circuit in FIG. 1 with nominal operating parameters.
Figure 2C:
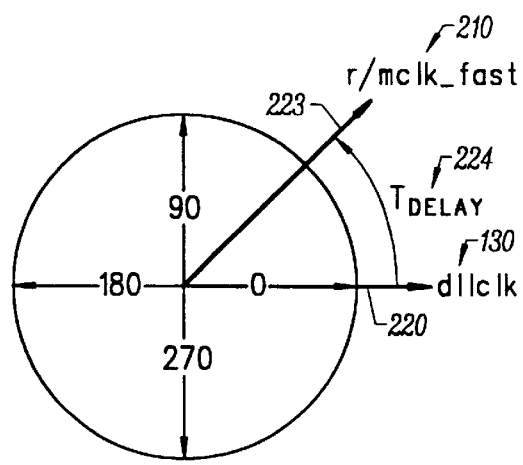
FIG. 2C is a phase diagram of the operation of the circuit in FIG. 1 with operating parameters that cause the circuit to operate faster.
Figure 2D:
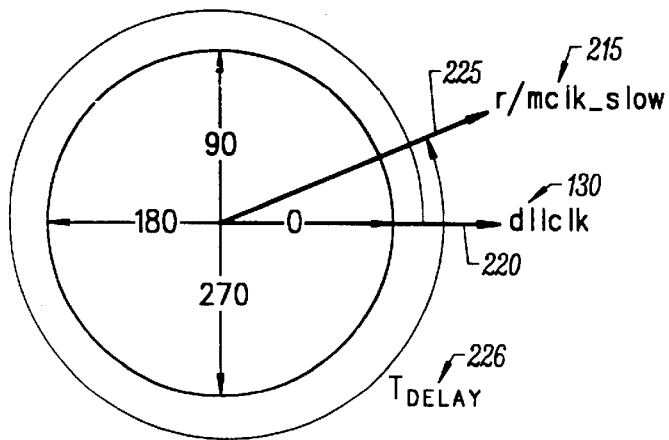
FIG. 2D is a phase diagram of the operation of the circuit in FIG. 1 with operating parameters that cause the circuit to operate slowly.
Figure 2E:
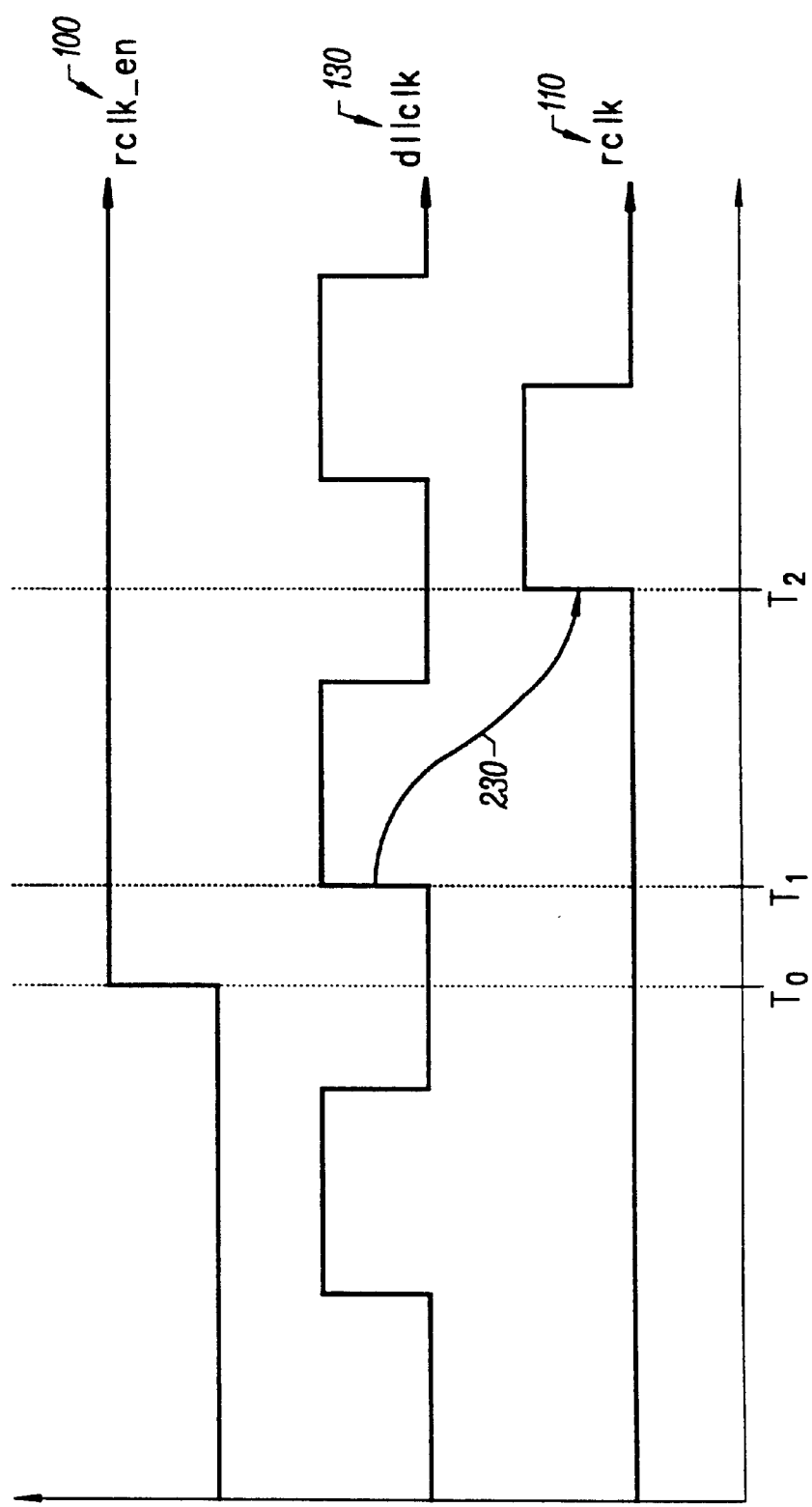
FIG. 2E is a timing diagram of the proper operation of the circuit in FIG. 1.
Figure 2F:
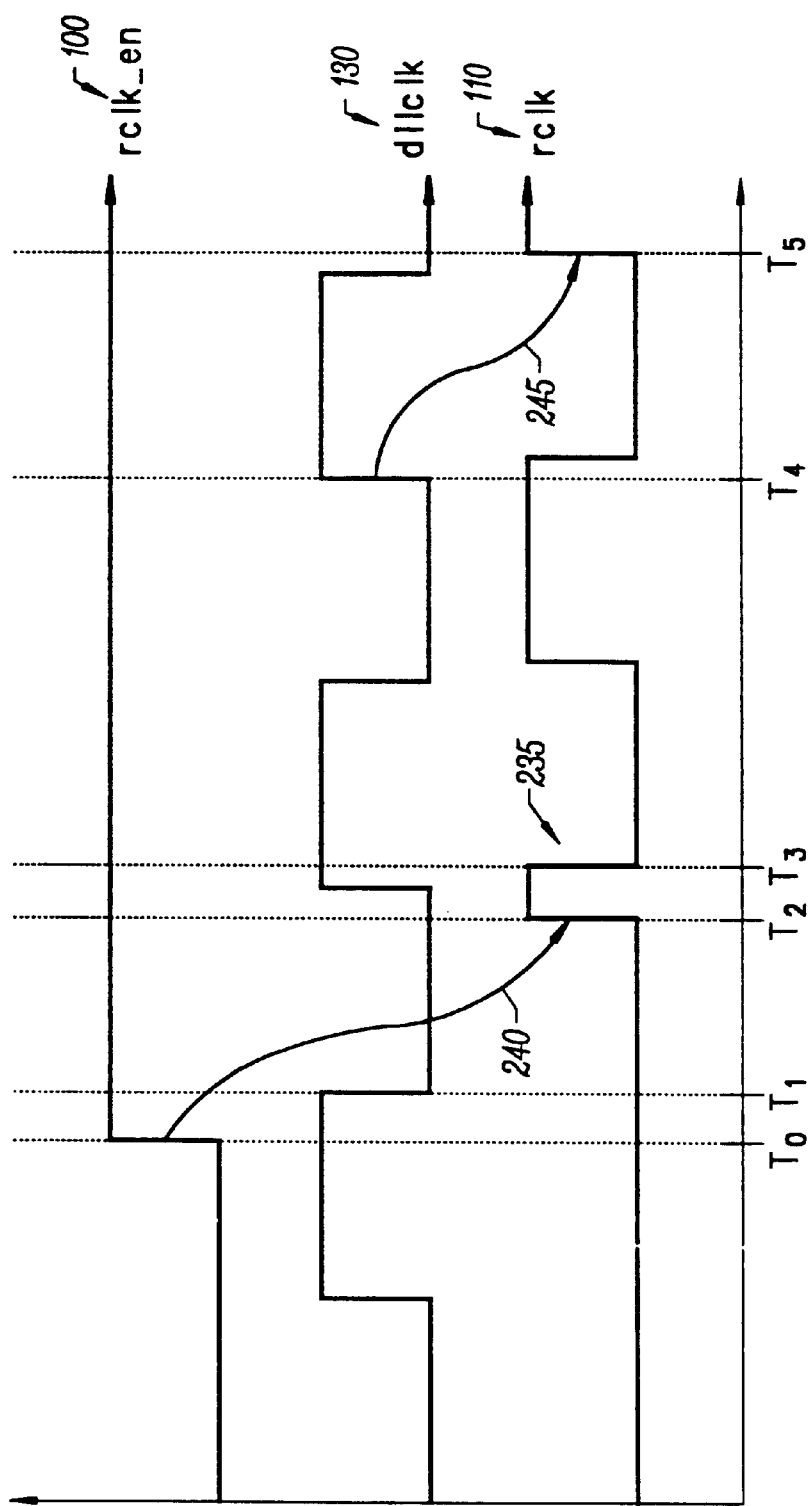
FIG. 2F is a timing diagram showing the generation of a runt pulse by the circuit in FIG. 1.
Figure 6C:
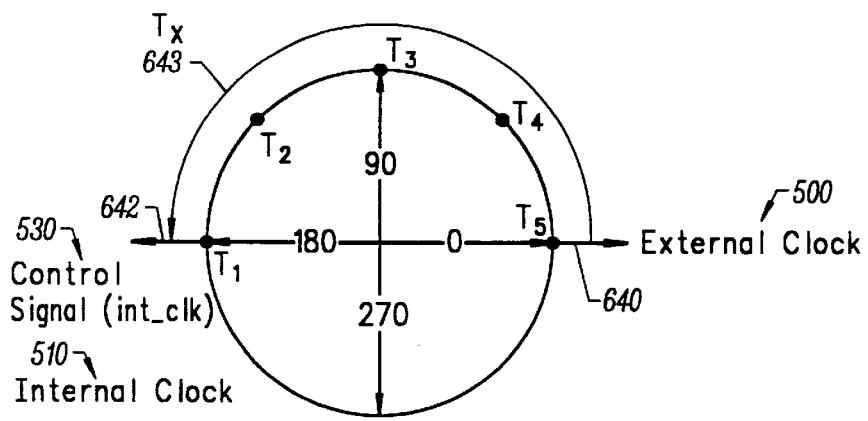
FIG. 6C is a phase diagram of the phase domain shifting which occurs during the operation of the circuit in FIG. 6A when operating at nominal speed.
Figure 6D:
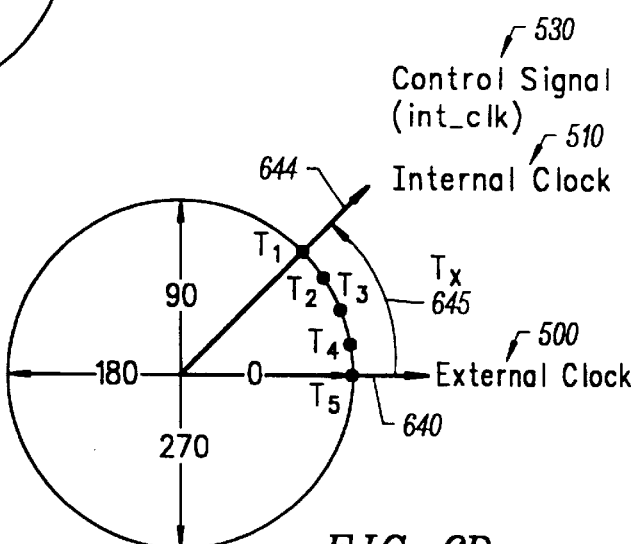
FIG. 6D is a phase diagram of the phase domain shifting which occurs during the operation of the circuit in FIG. 6A when operating faster than the nominal operating speed.
Figure 6E:
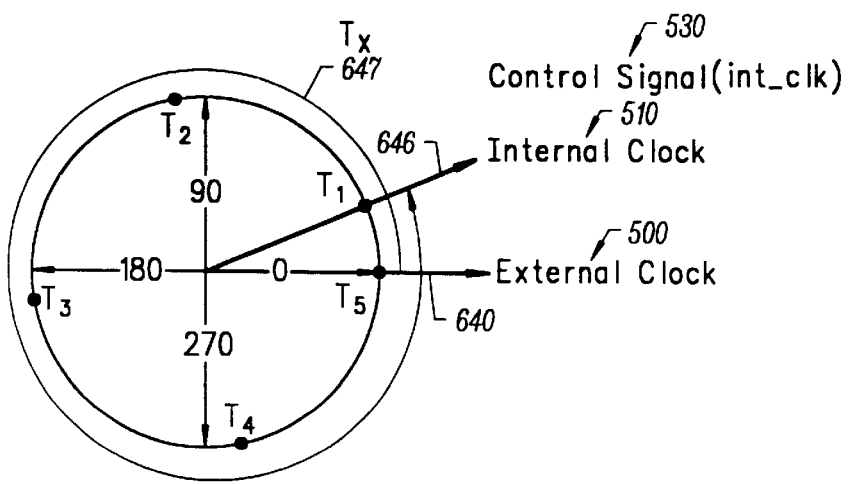
FIG. 6E is a phase diagram of the phase domain shifting which occurs during the operation of the circuit in FIG. 6A when operating more slowly than the nominal operating speed.

FIGS. 6C, 6D, and 6E are phase diagrams corresponding to FIGS. 2B, 2C, and 2D, respectively, and illustrate the operation of the circuit of FIG. 6A in these various situations. FIG. 6C illustrates the re-timing of control signal (int_clk) 530, which is shown as a vector 642 having a nominal phase delay of 180°. External clock 500 is shown as a vector 640 having a phase of 0°. Vector 642, also represented by internal clock 510, lags vector 640 by about 180°.

The various re-synchronization points illustrated in FIG. 6B ($T_1$ through $T_5$) are also shown in FIG. 6C. As is evident from the figure, re-timing is accomplished by successively delaying control signal (int_clk) 530 (vector 642), from one synchronization point to the next, using the rising or falling edge of the appropriate intermediate clock. This process occurs in a time $T_X$ 643, which is equal to the time $(T_5-T_1)$. Time $T_1$ corresponds to the phase domain of external clock 500, time $T_5$ corresponds to the phase domain of internal clock 510, and the remaining times correspond to the phase domain of their respective intermediate clocks.

A phase domain may be viewed as the collection of phase angles about a synchronization point such that a signal having one of those phase angles may safely be synchronized with a signal (e.g., a clock) having the phase angle of the synchronization point. A signal may be synchronized safely if the synchronization will not generate unwanted pulses (e.g., runt pulses). As an approximation, then, the phase domain of each of the synchronization points illustrated in FIG. 6C extends from the preceding synchronization point to the following one. Therefore, a signal synchronized with a given clock signal (e.g., control signal (int_clk) 530 synchronized with internal clock 510 at 180°) may safely be synchronized with the next successive clock signal (e.g., intermediate clock 604 at a phase angle of 135°). In this manner, control signal (int_clk) 530 is safely re-timed from the phase domain of internal clock 510 to that of external clock 500, thereby producing control signal (ext_clk) 540.

FIG. 6D illustrates the re-timing of control signal (int_clk) 530 for the case shown in FIG. 2C. External clock 500 is again shown as a vector 640 having a phase of 0°. Control signal (int_clk) 530 is represented by a vector 644. In this case, vector 644 lags vector 640 by only about 45° due to the aforementioned effects of environmental and process factors on inverter 132, first NAND gate 134, and inverter string 140. This may also be viewed as a decrease in the delay between internal clock 510, represented by vector 644, and external clock 500, which experiences only a short delay through the circuit elements thus affected. The delay needed to re-time control signal (int_clk) 530 is thus reduced to a time $T_X$ 645.

As is evident from FIG. 6A, the timing of intermediate clocks 600–604 are also dependent on these environmental and process factors. Thus, as the delay caused by each inverter pair in inverter string 140 (and that caused by inverter 132/first NAND gate 134) decreases, the phase angle between synchronization points decreases, with latch delays decreasing commensurately. As a result, latch delays decrease commensurately and control signal (int_clk) 530 is stepped through smaller phase angles in the synchronization process. In this manner, an apparatus according to the present invention compensates for the effects of environmental and process factors which decrease the propagation delays exhibited by integrated circuitry.

In a similar manner, an apparatus according to the present invention compensates for the effects of environmental and process factors which increase propagation delays. FIG. 6E illustrates the re-timing of control signal (int_clk) 530 for the case shown in FIG. 2D. External clock 500 is again shown as a vector 640 having a phase of 0°. Control signal (int_clk) 530 is represented by a vector 646. In this case, vector 644 lags vector 640 by about 385° due to the aforementioned factors. Alternatively, this may be viewed as an increase in the delay between internal clock 510, also represented by vector 646, and external clock 500. In this situation, external clock 500 experiences a long delay through the circuit elements thus affected. The delay needed to re-time control signal (int_clk) 530 is thus increased to a time $T_X$ 647. Here, the delay is increased, and the phase angle between synchronization points experiences a corresponding increase. As a result, control signal (int_clk) 530 is stepped through larger phase angles in the synchronization process. Thus, an apparatus according to the present invention is also capable of compensate for increases in the propagation delays exhibited by integrated circuitry.

Figure 6F:
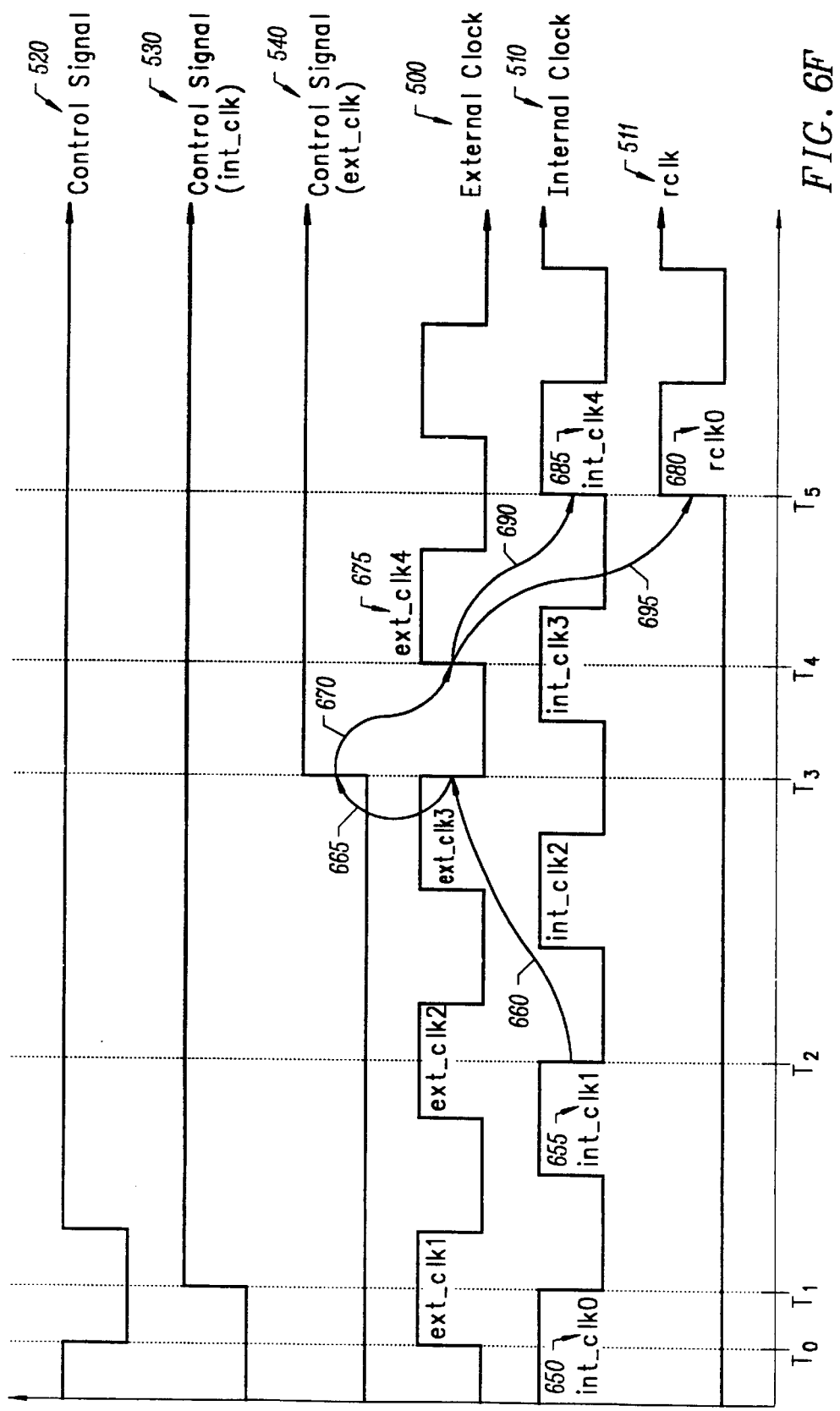
FIG. 6F is a second timing diagram of the proper operation of the circuit in FIG. 6A.

FIG. 6F further illustrates the timing relationships between the signals generated throughout the circuit illustrated in FIG. 6A, as well as their relationship to the clocking signal generated in FIG. 1. For clarity, it should be noted that control signal (ext_clk) 540 corresponds to rclk_en 100 in FIG. 1. Moreover, dllclk 130 and mclk 120 correspond to external clock 500 and internal clock 510, respectively. Also, as previously discussed, control signal 530 (i.e., rclk_en 100) is synchronized to internal clock 510 (i.e., mclk 120). Control signal 530 is preferably strobed at a time $T_1$ by the falling edge of a pulse int_clk0 650. Control signal (int_clk) 530 may transition at any time prior to $T_2$ (setup and hold time notwithstanding), but must be valid for the falling edge of internal clock 510 (represented by a pulse int_clk1 655) because it is at this point that the re-timing process begins.

Clock rclk 110 is then enabled by control signal (ext_clk) 540. This occurs from the point at which control signal (ext_clk) 540 transitions (i.e., time $T_3$), which is indicated by a transition 670. Transition 670 indicates that a pulse ext_clk4 675 occurring at a time $T_4$ will be allowed to propagate to generate rclk 110. From time $T_4$, external clock 500 (as exemplified by a pulse ext_clk4 675) propagates through inverter 132, first and second NAND gates 136 and 134, and inverter strings 140 and 150, emerging at a time $T_5$ as rclk 110, exemplified by pulse rclk0 680, and internal clock 510 (i.e., mclk 120), exemplified by a pulse int_clk4 685, as indicated by a trace 690 and a trace 695, respectively. As noted, because external clock 500 experiences the same delays in generating internal clock 510 and rclk 110, internal clock 510 and rclk 110 are synchronized with one another.

Figure 7:
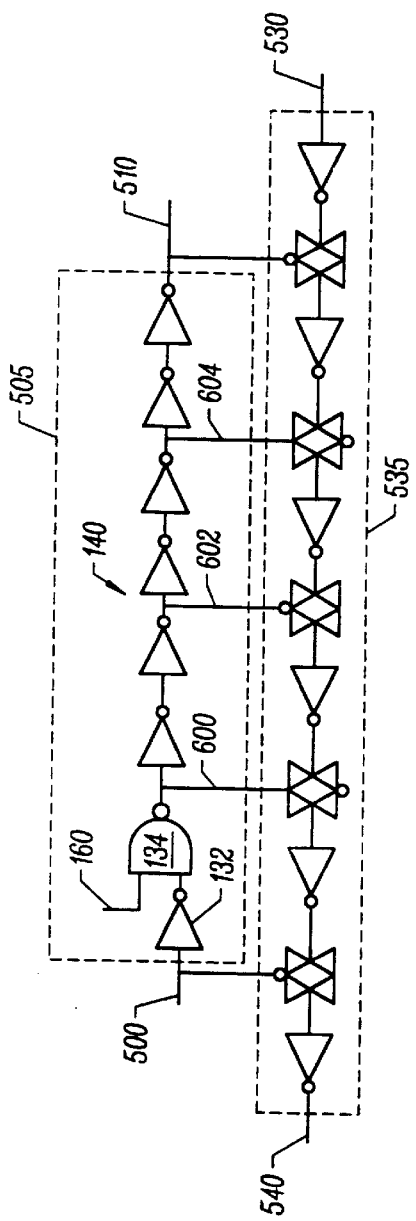
FIG. 7 is a circuit diagram of another embodiment of the present invention which follows the architecture shown in FIG. 5.

FIG. 7 illustrates an alternative embodiment of the present invention. Circuit element 505 and its constituent elements, and all related signals are defined identically to those in FIG. 6A. The method is very similar to that of the circuit in FIG. 6A. However, the elements shifting the control signal from the phase domain of internal clock 510 into the phase domain of external clock 500 differ slightly. In FIG. 7, pass transistors and inverters are used in place of the latches illustrated in FIG. 6A. As before, control signal (int_clk) 530 is introduced into circuit element 535 and is successively synchronized to internal clock 510, intermediate clocks 604, 602, and 600, and finally external clock 500. Again, the pass transistors alternate between inverting and non-inverting inputs to allow the signal propagated to traverse circuit element 535 as quickly as possible.

Figure 8:
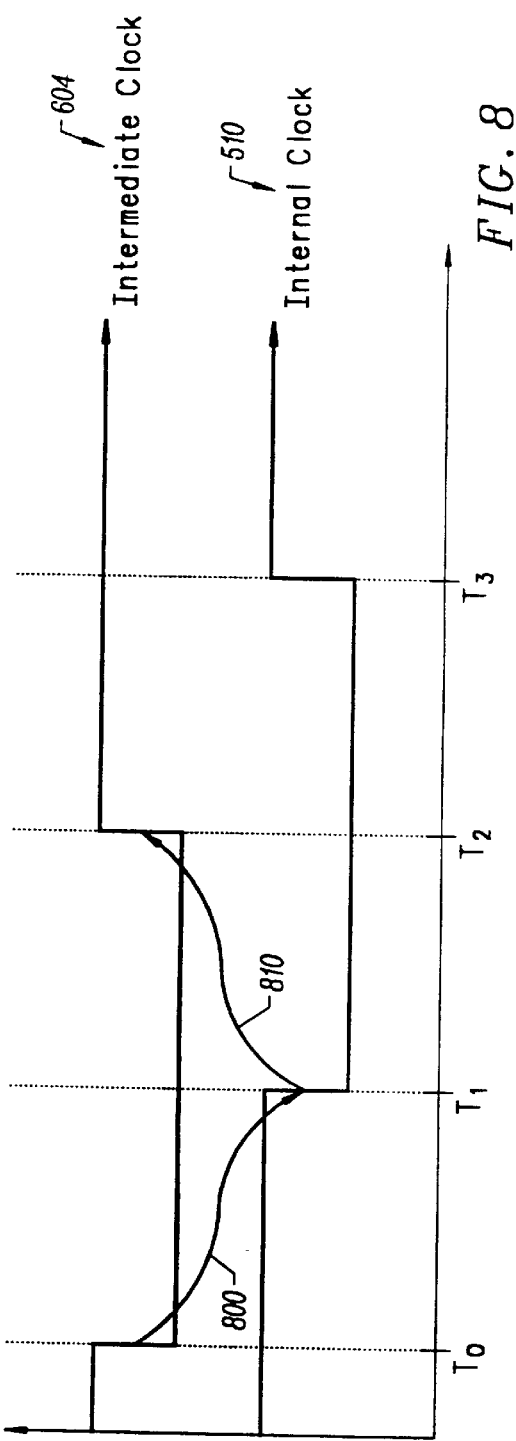
FIG. 8 is a timing diagram showing maximum delays which may occur in a circuit of the present invention, such as those shown in FIGS. 6A and 7.

FIG. 8 illustrates timing constraints using the signals of intermediate clock 604 and internal clock 510 as previously illustrated in FIG. 6B. For proper operation of a circuit according to the present invention, the following conditions must be met:

$$T_{ext\_clk} > 4t_{inv} + 2t_{p\_latch} + 2t_{su\_latch} \tag{2}$$

$$F_{ext\_clk} < \frac{1}{4t_{inv} + 2t_{p\_latch} + 2t_{su\_latch}} \tag{3}$$

where $T_{ext\_clk}$ is the period of external clock 500, $t_{inv}$ is the delay of one of the inverters in inverter string 140, $t_{p\_latch}$ is the delay of latch 610 (preferably, a similar delay is caused by all the latches), $t_{su\_latch}$ is the setup time of latch 610 (again, all the latches preferably exhibit similar setup times), and $F_{ext\_clk}$ is the frequency of external clock 500. These formulae are for a circuit such as that shown in FIG. 6A, where intermediate clocks are generated using two inverters and latches are employed to re-synchronize the control signal. The above limitation can be generalized to:

$$T_{ext\_clk} > d(n-1) \quad (4)$$

$$F_{ext\_clk} < \frac{1}{d(n-1)} \quad (5)$$

where $T_{ext\_clk}$ is the period of external clock 500, d is the delay between each intermediate clock, n is the number of intermediate clocks (including the internal clock), and $F_{ext\_clk}$ is the frequency of external clock 500. Thus, a number of delays which can be used to successfully delay a control signal from the phase domain of the internal clock to that of the external clock is n (there may be more than a single number that meets this criteria, depending on the delay of each delay element and the frequencies involved). Again, $F_{ext\_clk}$ is the inverse of $T_{ext\_clk}$, and is given for completeness.

If the frequency of external clock 500 is above $F_{ext\_clk}$, a circuit of the present invention ceases to function properly. In such a case, the signal propagated through circuit element 535 fails to meet $t_{su\_latch}$ (i.e., the setup time of the next latch). Thus, the propagated signal is not ready to be latched by the next latch at the falling edge of the next intermediate clock signal. This introduces the possibility of metastability. At a minimum, this results in the control signal being delayed an additional full clock cycle, greatly increasing the overall latency of circuit element 535 and thus the response time of the circuit of the present invention. These delays are shown in FIG. 8 as transitions 800 and 810. Transition 800 represents the delay between intermediate clock 604 and internal clock 510 caused by the two inverters in the signal path. Transition 810 represents the delay of latch 610 plus any additional time remaining between when the clock signal output by latch 610 stabilizes and the next rising edge of intermediate clock 604.

A circuit according to the method of the present invention offers several advantages. In its operation, such a circuit avoids the generation of runt pulses while providing synchronized control signals with minimum latency. Additionally, the method of the present invention is not susceptible to the failure modes which can occur with simple gating schemes, also avoiding the need to compute MTBF figures.

The method of the present invention is insensitive to both process variations and changes in device feature size, as well as environmental perimeters such as temperature and supply voltage. For example, a rise (fall) in supply voltage or a decrease (increase) in operating temperature decreases (increases) the delays experienced in integrated circuitry. However, because the given factor speeds or slows both the circuitry generating the internal clock and that synchronizing the control signal, no aggregate effect is observed and the circuitry remains synchronized.

The method of the present invention is not intended to be limited by the preceding statements. A person of ordinary skill in the art will realize that different circuitry can be used and alterations can be made to the method of the present invention without departing from the spirit of the invention. Other equivalent or alternative methods of synchronizing a signal according to the present invention will be apparent to those skilled in the art. For example, flip-flops may be employed in place of the latches of the present invention, and may be edge-triggered to permit synchronization on rising clock edges. These equivalents and alternatives are intended to be included within the scope of the present invention.

What is claimed is:

1. A method of synchronizing a control signal, the control signal being synchronous to a second clock, the method comprising the steps of:
    generating a plurality of intermediate clock signals, each one of said plurality of intermediate clock signals being generated by delaying a first clock, a last one of said plurality of intermediate clock signals being the second clock;
    receiving the control signal;
    synchronizing the control signal with one of said of intermediate clock signals to produce one of a plurality of intermediate control signals;
    synchronizing said one of said plurality of intermediate control signals with another of said plurality of intermediate clock signals to produce another of said plurality of intermediate control signals with a phase corresponding to a phase of said another of said plurality of intermediate clock signals; and
    repeating said step of synchronizing said one of said plurality of intermediate control signals to produce said plurality of intermediate control signals with phases corresponding to phases of said plurality of intermediate clock signals;
    whereby the phase of the control signal is incrementally shifted.

2. The method of claim 1, wherein the control signal is synchronized to a rising edge of said one of said plurality of intermediate clock signals and said one of said plurality of intermediate control signals is synchronized to a falling edge of said another of said plurality of intermediate clock signals.

3. The method of claim 1, wherein said plurality of intermediate control signals are alternately synchronized to a rising edge and a falling edge of said plurality of intermediate clock signals.

4. An apparatus comprising:
    a first circuit to generate delayed clock signals, each delayed clock signal lagging a first clock signal by a respective delay time; and
    a second circuit coupled to receive the delayed clock signals from the first circuit and having an input to receive a control signal, the second circuit being adapted to shift the phase of the control signal a plurality of times in response to respective transitions of a plurality of the delayed clock signals until the control signal is in phase with one of the delayed clock signals that is least delayed relative to the first clock signal.

5. The apparatus of claim 4, wherein the second circuit further includes an input to receive the first clock signal, and wherein, after the control signal is in phase with the one of the delayed clock signals that is least delayed relative to the first clock signal, the second circuit is adapted to shift the phase of the control signal in response to a transition of the first clock signal to synchronize the control signal with the first clock signal.

6. The apparatus of claim 4, wherein the first circuit is adapted to generate the delayed clock signals such that each of the delayed clock signals, other than the one of the delayed clock signals that is least delayed relative to the first clock signal, is incrementally more delayed, relative to the first clock signal, than another of the delayed clock signals.

7. The apparatus of claim 4, wherein the second circuit is adapted to shift the phase of the control signal first in response to respective transitions of the delayed clock signals, starting with a transition of a most delayed one of the delayed clock signals and progressing in order of descending delay until the phase of the control signal is shifted in response to a transition of the one of the delayed clock signals that is least delayed relative to the first clock signal.

8. An apparatus comprising:
    a first circuit to generate delayed clock signals, each delayed clock signal lagging a first clock signal by a respective delay time; and
    a second circuit coupled to receive the delayed clock signals from the first circuit and having an input to receive a control signal, the second circuit being adapted to shift the phase of the control signal a plurality of times in response to respective transitions of a plurality of the delayed clock signals until the control signal is in phase with one of the delayed clock signals that is least delayed relative to the first clock signal;
    wherein the second circuit comprises a plurality of circuit elements, a first one of the plurality of circuit elements receiving the control signal and a most delayed one of the plurality of delayed clock signals, and each successive one of the plurality of circuit elements receiving an output from a preceding one of the plurality of circuit elements and a progressively less delayed one of said plurality of delayed clock signals.

9. The apparatus of claim 8, wherein the first one of the plurality of circuit elements is adapted to output the control signal in response to a transition of the most delayed one of the delayed clock signals, and each successive one of the plurality of circuit elements is adapted to output, in response to a transition of a corresponding one of the delayed clock signals, the control signal received from a preceding one of the plurality of circuit elements.

10. The apparatus of claim 9, wherein each of the plurality of circuit elements comprises a delay element.

11. The apparatus of claim 10, wherein each of the plurality of circuit elements further comprises a pass gate coupled in series with the delay element, the pass gate having a control input coupled to receive a respective one of the delayed clock signals.

12. The apparatus of claim 9, wherein each of the plurality of circuit elements comprises a respective clocked circuit element.

13. The apparatus of claim 12, wherein the clocked circuit element comprises a latch.

14. The apparatus of claim 12, wherein said clocked circuit element comprises an edge-triggered flip-flop.

15. A method comprising:
    generating a set of delayed clock signals, each delayed clock signal lagging a first clock signal by a respective delay time; and
    shifting the phase of a control signal a plurality of times in response to respective transitions of a plurality of the delayed clock signals until the control signal is in phase with one of the delayed clock signals that is least delayed relative to the first clock signal.

16. The method of claim 15 further comprising shifting the phase of the control signal in response to a transition of the first clock signal to synchronize the control signal with the first clock signal.

17. The method of claim 15, wherein generating a set of delayed clock signals comprises generating a plurality of delayed clock signals that, except for the one of the delayed clock signals that is least delayed relative to the first clock signal, are each incrementally more delayed, relative to the first clock signal, than another of the delayed clock signals.

18. The method of claim 15, wherein shifting the phase of a control signal a plurality of times in response to respective transitions of a plurality of the delayed clock signals comprises shifting the phase of the control signal in response to each of the delayed clock signals in a sequence that progresses from a most delayed one of the delayed clock signals to the one of the delayed clock signals that is least delayed relative to the first clock signal.

19. The method of claim 18, wherein shifting the phase of the control signal a plurality of times in response to respective transitions of a plurality of the delayed clock signal comprises controlling propagation of the control signal through a chain of circuit elements such that the phase of the control signal is incrementally shifted as the control signal is propagated from one circuit element in the chain to a next circuit element in the chain.

20. An apparatus comprising:
    means for generating a set of delayed clock signals, each delayed clock signal lagging a first clock signal by a respective delay time; and
    means for shifting the phase of the control signal a plurality of times in response to respective transitions of a plurality of the delayed clock signals until the control signal is in phase with one of the delayed clock signals that is least delayed relative to the first clock signal.

21. The apparatus of claim 20 further comprising means for shifting the phase of the control signal in response to a transition of the first clock signal to synchronize the control signal with the first clock signal.

22. A method of synchronizing a control signal with a first clock signal, the control signal being synchronous to a second clock signal, the method comprising the steps of:
    generating a plurality of intermediate clock signals, each of said plurality of intermediate clock signals being generated by delaying the first clock signal, a last one of said plurality of intermediate clock signals being the second clock signal;
    receiving the control signal;
    shifting the phase of the control signal a plurality of times with said plurality of intermediate clock signals and the first clock signal until the phase of said control signal corresponds to the phase of said first clock signal.

23. The method of claim 22, wherein the shifting step comprises
    synchronizing the control signal to a rising edge of one of said plurality of intermediate clock signals; and
    subsequently synchronizing the control signal to a falling edge of the first clock signal.

24. The method of claim 22, wherein the shifting step comprises
    alternately synchronizing the control signal to a rising edge and a falling edge of the plurality of intermediate clock signals and the first clock signal.

* * * * *